United States Patent
Krieger et al.

(10) Patent No.: US 10,500,842 B2
(45) Date of Patent: Dec. 10, 2019

(54) AUTOMATED IMAGE SENSOR CALIBRATION

(71) Applicant: HEIDELBERGER DRUCKMASCHINEN AG, Heidelberg (DE)

(72) Inventors: Jan Krieger, Heidelberg (DE); Frank Muth, Karlsruhe (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 16/128,731

(22) Filed: Sep. 12, 2018

(65) Prior Publication Data
US 2019/0077143 A1   Mar. 14, 2019

(30) Foreign Application Priority Data
Sep. 12, 2017 (DE) .................. 10 2017 216 041

(51) Int. Cl.
| | |
|---|---|
| B41J 2/045 | (2006.01) |
| B41J 2/21 | (2006.01) |
| G06K 15/02 | (2006.01) |
| H04N 1/60 | (2006.01) |
| B41J 2/14 | (2006.01) |

(52) U.S. Cl.
CPC ....... B41J 2/04505 (2013.01); B41J 2/04586 (2013.01); B41J 2/2139 (2013.01); B41J 2/2142 (2013.01); G06K 15/027 (2013.01); H04N 1/6033 (2013.01); *B41J 2/14* (2013.01)

(58) Field of Classification Search
CPC .. B41J 2/04505; B41J 2/04586; B41J 2/2139; B41J 2/2142; B41J 2/2125; B41J 2/14; G06K 15/027; H04N 1/6033
See application file for complete search history.

(56) References Cited

U.S. PATENT DOCUMENTS

| | | | |
|---|---|---|---|
| 8,459,773 B2 | 6/2013 | Jimenez et al. | |
| 8,807,684 B2 * | 8/2014 | Allworth | B41J 2/16579 347/14 |
| 9,090,058 B2 | 7/2015 | Abergel et al. | |
| 2011/0074861 A1 | 3/2011 | Saettel et al. | |
| 2015/0174934 A1 | 6/2015 | Bogart | |

FOREIGN PATENT DOCUMENTS

DE   102012101432 A1   8/2013

\* cited by examiner

*Primary Examiner* — Thinh H Nguyen

(74) *Attorney, Agent, or Firm* — Laurence A. Greenberg; Werner H. Stemer; Ralph E. Locher

(57) ABSTRACT

A method calibrates image sensors and adjusts print heads in an inkjet printing machine via a computer. The method includes printing a test print chart, recording the printed test print chart via an image sensor to create a digital image, determining a coordinate transformation between the coordinates on the test print chart and the coordinates of the image sensor and the print heads, implementing a computer-assisted evaluation process of the digital image to determine the coordinates on the test print chart, deriving correction values for print head adjustment and camera calibration from results of the coordinate transformation and/or the comparison thereof with the determined measured values, and implementing the print head adjustment and the camera calibration by the computer. The test print chart has filled circular discs. The filled circular discs have a minimum diameter that is selected for them to function even if defective printing nozzles occur.

8 Claims, 6 Drawing Sheets

AUTOMATED IMAGE SENSOR CALIBRATION

CROSS-REFERENCE TO RELATED APPLICATION

This application claims the priority, under 35 U.S.C. § 119, of German application DE 10 2017 216 041.1, filed Sep. 12, 2017; the prior application is herewith incorporated by reference in its entirety.

BACKGROUND OF THE INVENTION

Field of the Invention

The present invention relates to a method for automated image sensor calibration and adjustment of print heads in an inkjet printing machine by a computer.

The technical field of the invention is the field of digital printing.

In digital printing or, to be more precise, in the field of inkjet printing, an accurate alignment of the print heads of an inkjet printing machine is an absolute necessity to ensure that the printing machine not only operates correctly, but also meets the print quality requirements. The inkjet print heads in their mounts may be adjusted by hand; however, nowadays the print heads are preferably adjusted in an automated way by smaller electric motors. To be able to do this with a sufficient degree of accuracy, it is thus advantageous if the information required for this process is likewise determined in an automated way in a computer-assisted calibration process.

Many printing machines commonly include an automated camera-assisted image recording system for monitoring the quality of the prints that are created. In most cases, this image recording system consists of image sensors, i.e. of one or more cameras installed downstream of the last printing or varnishing unit in the printing machine. The image recording system further contains an image processor for examining the recorded images to find potential defects and lateral and circumferential register problems and checking the print color values that have been attained. In inkjet printing machines, the image recording system is additionally used to detect what are known as missing nozzles, i.e. failed or defective printing nozzles. The defects that are created at the location in the print where the defective printing nozzles do not jet a sufficient amount of ink or none at all or place the ink at the wrong location are referred to as white lines and are visible as strip-shaped artifacts in the print. These defects may be white if only one color is to be applied at the respective location, or they may be discernible as color distortions if multiple colors are used.

When an automated camera-assisted image recording system in an inkjet printing machine is used to accomplish these tasks, a coordinate transformation between the print coordinate system (i.e. the printing nozzles of the print head) and the recorded camera images needs to be calculated to find the areas in the print that are to be used in various evaluations (e.g. identifying nozzle test charts in the camera image). This may then be used to implement automated image sensor calibration for the cameras that are used. In a further step, the information of the coordinate transformation between the print coordinate system and the generated camera images may then be additionally used to adjust the print heads with great accuracy.

The determination of a coordinate transformation between the camera image and World Coordinates is fundamentally a well-established technique in image evaluation and referred to as camera calibration (also available, for instance, in image processing libraries such as OpenCV). It usually involves the use of chessboard-type patterns or dot grids.

Register errors of (digital) printing machines are frequently measured using patterns that may be evaluated "by hand"/using a microscope. They include for instance successions of lines that are printed by the two print heads/bars to be examined and whose distances from one another are measured, or specific small dot patterns the respective dots of which are printed only by individual or a few printing nozzles. Such patterns require a high degree of accuracy and a high resolution from the image recording system and are thus not optimally suited for use with an in-line image recording system in the printing machine. They may even require an external microscope for taking measurements or specialized image sensors in the printing machine.

U.S. patent publication No. 20150174934A1, a more recent patent application in this field, describes specific patterns that result in assessable intensity gradients due to the overlapping prints of two print heads.

U.S. Pat. No. 9,090,058 B2 discloses a similar method for aligning print heads and checking the alignment of print heads. However, the document does not provide any information on specific artifacts created by digital printing systems (e.g. by missing nozzles) or on the accuracy of the detection of the test print charts.

In the past few years, methods for the high-precision localizing of individual light emitters on a camera image have been developed in the field of super-resolution microscopy (PALM/STORM).

In addition, U.S. Pat. No. 8,459,773 B2 discloses a method for adjusting print heads wherein printed test print charts are recorded by a HD camera and correction values for print head alignment are then calculated from these values.

A disadvantage of all those methods known from the prior art is, however, that they have all mainly used test print charts that have not been optimized for digital printing, for instance line patterns that are printed only by a few nozzles or by individual nozzles and may thus be easily distorted by failed nozzles or nozzles that jet at an angle. In addition, they are not designed for evaluation with automated image processing systems. The line patterns frequently used in the prior art are often much more difficult to find and measure than other test print charts such as circular discs.

Another disadvantage is that the test print charts that are used are not designed for being recorded by typical in-line image recording systems such as the described camera system. Instead, they are intended to be measured by separate external measurement microscopes. In addition, these systems are frequently not designed to attain the accuracy of the printing process—despite the use of a lower-resolution camera system that keeps the amount of data and the processing time within acceptable limits.

SUMMARY OF THE INVENTION

Thus an object of the present invention is to provide a method for automatically calibrating image sensors and automatically adjusting print heads in an inkjet printing machine in a way that is better and more efficient than the methods of the prior art.

In accordance with the invention, this object is attained by a method for calibrating image sensors and adjusting print heads in an inkjet printing machine in an automated way by a computer. The method includes the steps of printing a test print chart, recording the printed test print chart by means of at least one image sensor to create a digital image, determining a coordinate transformation between the coordinates on the test print chart and the coordinates of the at least one image sensor and the print heads by means of the computer, and implementing a computer-assisted evaluation process of the digital image to determine the coordinates on the test print chart. Correction values are derived for print head adjustment and camera calibration from results of the coordinate transformation and/or the comparison thereof with the determined measured values of the test print chart by means of the computer. The print head adjustment and the camera calibration are implemented by means of the computer and using the correction values. The method is characterized in that the test print chart contains filled circular discs, the filled circular discs have a minimum diameter that is selected in a way for them to function in an optimal way even if defective printing nozzles occur. In contrast to the known standard processes, the method of the invention includes an adaptation of the evaluation process to the specific conditions of inkjet printing machines:

Specific algorithms are written to find individual circular disks in a print chart, allowing them to attain a degree of accuracy that is sufficient for an accurate alignment of individual printing nozzles (i.e. better than 0.5 printing nozzles or, for PrimeFire, better than 0.3 camera pixels) even if a limited number of white lines/angled nozzles is present, and Automated test methods are designed to ensure a reliable evaluation even without monitoring by a human user.

Outliers in the data are recognized and eliminated, for instance if an entire print head is misaligned.

Specific information on the individual print heads is deduced at the same time as the coordinate transformation calibration takes place (no need for two prints).

The print chart (circle size, distribution on the sheet for multiple colors) is configured in a way for the aforementioned algorithms to be successful and for the required accuracy to be maintained across the entire sheet.

The print charts are designed to factor in the specific characteristics of the digital printing machine (subdivision into print heads that are independently mounted in every bar) and to allow the parameters of the individual print heads to be determined (multiple dots per print head, no dots in the stitching area . . . ).

The method of the invention has several advantages over prior art methods. For instance, only one test print chart is required to calculate various parameters in one step, a fact that reduces waste and saves time. The coordinate transformation needs to be made every day anyway; the method of the invention derives added value from this process. In addition, no special register sensors are required, a fact which reduces the complexity of the inkjet printing machine and thus saves costs. Moreover, a single camera system evaluates many aspects. This means that the system may make use of synergies between the different evaluations and may easily combine data from different sources to improve results and cross-check them relative to one another.

The ideal minimum diameter of the filled circular discs is essentially a function of the resolution of the camera. The disc size may be determined experimentally with the aid of a simulation. For high-quality images obtained by the camera system described below, a target size of 60 camera pixels or >2.2 mm in diameter at a camera resolution of 670 dpi is sufficient.

Advantageous and thus preferred further developments of the present invention will become apparent from the associated dependent claims as well as from the description and the associated drawings.

A preferred further development of the method of the invention in this context is that for all color separations that are used, a test print chart consisting of filled circular discs is printed, every print head printing at least two complete rows of at least three calibration dots in the form of the filled circular discs, the discs not in the stitching range of the print head and the at least two complete sets distributed over the printing substrate in such a way that they span the largest possible area in the direction of paper transport. Rows of filled circular discs are arranged on a print sheet in such a way that every print head creates discs. A minimum of three discs for every print head are distributed in such a way that they are not printed in the stitching region. Every print head should print at least two complete sets of neighboring circular discs. The discs are to be distributed across the sheet in such a way that they span the largest possible area in the y-direction. This ensures a high resolution in both coordinate directions (x=direction of print bar, y=direction of paper transport). This test print chart is printed for all color separations and evaluated in a corresponding way.

A further preferred further development of the method of the invention in this context is that a test print chart containing filled circular discs is printed, every print head printing at least two complete blocks of rows of at least two calibration dots in the form of the filled circular discs, the discs not located in the stitching region of the print head, and every block including at least one row of at least two calibration dots for every color separation that is used and the rows of at least two calibration dots distributed over the printing substrate in such a way that they span the largest possible area in the direction of paper transport. In this embodiment of the method of the invention, the test print chart that is described above and is to be printed includes rows of calibration dots for every one of the color separations that are used. As a result, only one test print chart that contains all color separations and consequently all information required for the method on all print heads to be used advantageously needs to be printed. It is not necessary to print and evaluate a separate test print chart for every color separation/every print head. Instead, the test print chart to be printed in accordance with this embodiment is a little more complex and contains fewer calibration dots for every color separation than the embodiment requiring a test print chart for every color separation.

A further preferred further development of the method of the invention in this context is that the printing substrate region to be printed on and recorded by the at least one image sensor is subdivided into image sensor regions corresponding to the number of image sensors that are used. Every one of the at least one image region sensor regions includes a reference dot in the form of a filled circular disc printed centrally above the calibration dots. The reference dot is used for referencing within an individual image sensor region. An additional, separate dot is provided for every camera at a certain distance from the large rows and as close to the beginning of the print chart as possible to provide a reference dot for localizing dots.

A further preferred further development of the method of the invention in this context is that a camera system is provided to record the printed test print chart by at least one image sensor. The camera system contains multiple line scan cameras disposed next to one another, the line scan cameras recording the printed test print chart at a resolution of at least 40-60% of the print resolution. In the advancing direction, the cameras are synchronized with the print row cycle, resulting in a distortion-free recording of the images even in the case of pre-tensioned webs of paper in a web-fed inkjet printing machine. The cameras are connected to a fast data processor for running the method. Via a network interface, the results are then forwarded to the machine control unit and a user's display such as a wall screen.

A further preferred further development of the method of the invention in this context is that the computer-assisted evaluation process for determining the coordinates on the test print chart is done by detecting the center of the calibration dots. The method contains the following steps of:
converting the recorded nozzle test print chart into a high-contrast grayscale image;
cutting an image region out of the entire digital image;
optionally implementing an edge detection process;
optionally converting the image region into a binary image and filtering line artifacts out of the binary image;
optionally adding a cross through the center of the circular disc to the binary image to create a binary mask;
optionally widening the binary mask by dilatation;
determining the parameters of a model of the print dot from the original image, optionally using the binary mask; and
checking the results, in particular whether the center and the radius of the circular disc are within the expected range.

The coordinate transformation method requires a method that determines the center of a circular disc at a sub-pixel level of accuracy. This algorithm will work even if the circular disc is not completely located in the ROI and only a proportion >50-60% is visible. However, in this case the degree of accuracy may be affected, which may, however, be factored in by a weighting or scoring of the results. Some steps of the method are optional. They may, however, make the method faster or more accurate.

A further preferred further development of the method of the invention in this context is that the coordinate transformation contains the following steps of:
searching the reference dot in the currently evaluated region of the nozzle test print chart by means of the theoretically calculated coordinate transformation that is already present;
selecting the color channel with the highest contrast if the camera has multiple color channels;
refining the initial coordinate transformation using the center coordinates of the reference dot;
determining the positions of the available calibration dots by cutting out image regions about the respective calibration dots and implementing the evaluation process described above;
filtering out deviating calibration dots and errors;
determining the parameters of a model of the coordinate transformation using the remaining calibration dots if sufficient calibration dots remain after filtering;
determining the deviation of the calibration dots from their expected ideal position; and
combining the deviations as results for the individual print heads.

The required coordinate transformation between the coordinates on the test print chart and the coordinates of the at least one image sensor and the print heads is carried out in accordance with this method. From the results of this coordinate transformation, the computer may derive the correction values for print head alignment and camera calibration, and the correction values may be used to adjust the print head and calibrate the camera.

A further preferred further development of the method of the invention in this context is that the coordinate transformations calculated for multiple color separations are used to determine register deviations in the form of positional deviations of the individual print colors relative to one another and to correct them. The detection of register deviations by means of the image recording system and the method of the invention make it unnecessary separately to determine these deviations by means of sensors and/or in a separate process from the data of the image recording system.

A further preferred further development of the method of the invention in this context is that the calculation of the register deviations is implemented at various locations distributed over the test print chart to determine a register deviation average. The image recording system determines register deviations in an ideal way at different locations distributed across the sheet and provides an error average.

The invention as such as well as further developments of the invention that are advantageous in constructional and functional terms will be described in more detail below with reference to the associated drawings and based on at least one preferred exemplary embodiment. In the drawings, mutually corresponding elements have the same reference symbols.

Other features which are considered as characteristic for the invention are set forth in the appended claims.

Although the invention is illustrated and described herein as embodied in an automated image sensor calibration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
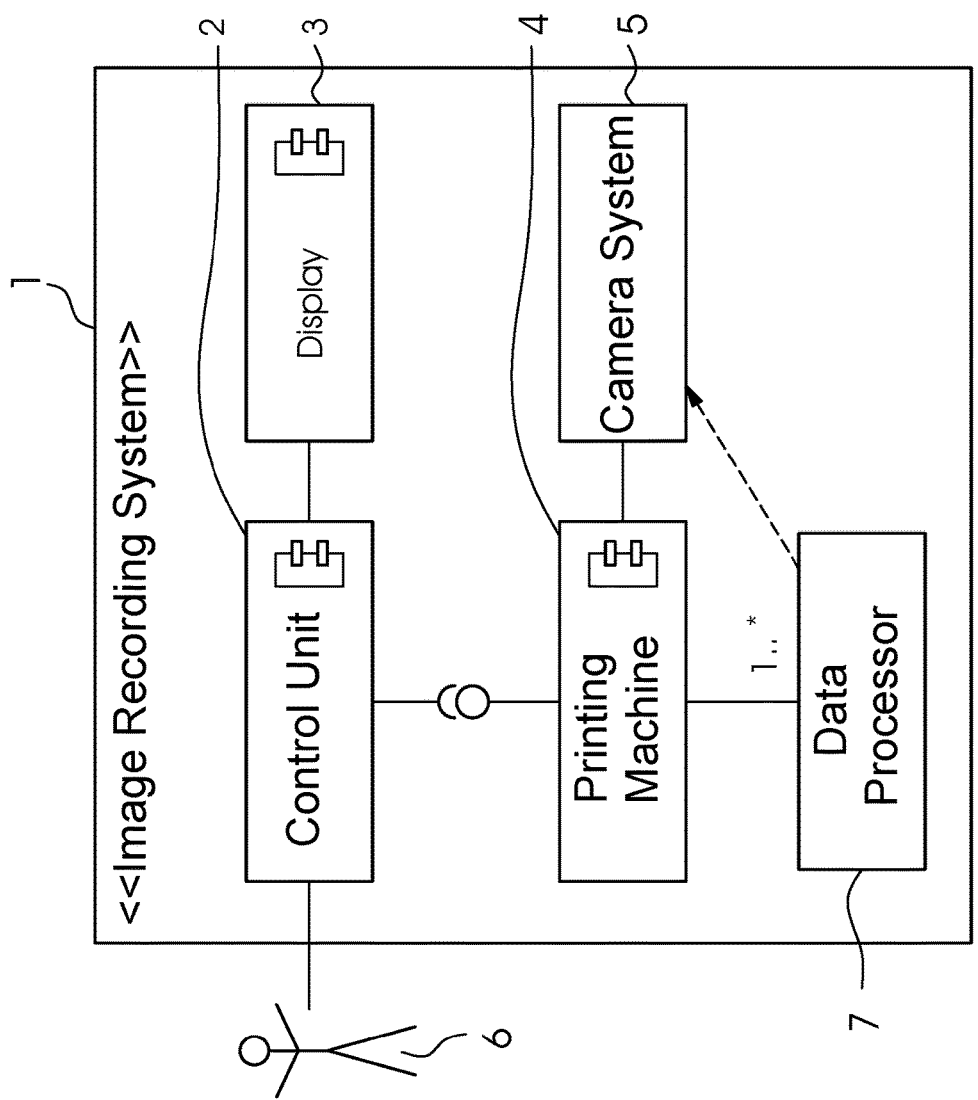
FIG. 1 is an illustration of a structural design of an image recording system.

Referring now to the figures of the drawings in detail and first, particularly to FIG. 1 thereof, there is shown a method of the invention that is implemented as a part of camera evaluation software in an inkjet printing machine 4, preferably in a sheet-fed inkjet printing machine 4 and, in a further preferred embodiment, in a similar structural design, in a web-fed inkjet printing machine 4. An image recording system 1 required for this purpose includes a camera system 5 having one or more line scan cameras that scan the sheet/label at high resolution after the printing operation.

The structure of the system 1 is schematically shown in FIG. 1. The resolution of the camera 5 is about 40-60% of the print resolution. In the advancing direction, the cameras are synchronized with the print row cycle or with a cycle that is obtained from the web (rotary encoder, idler wheel.). As a result, the images are recorded without distortion, even if pre-tensioned webs of paper are used in a web-fed inkjet printing machine 4. The cameras are connected to a fast data processor 7 for running the method. It is possible to implement the method on the control unit 2 of the printing machine 4, but the data processor/image processor 7 is the preferred device for implementing the method. Via a network interface, the results are then forwarded to the machine control unit and to a display for the user 6 (e.g. a wall screen/display 3 of the printing machine 4).

Figure 4:
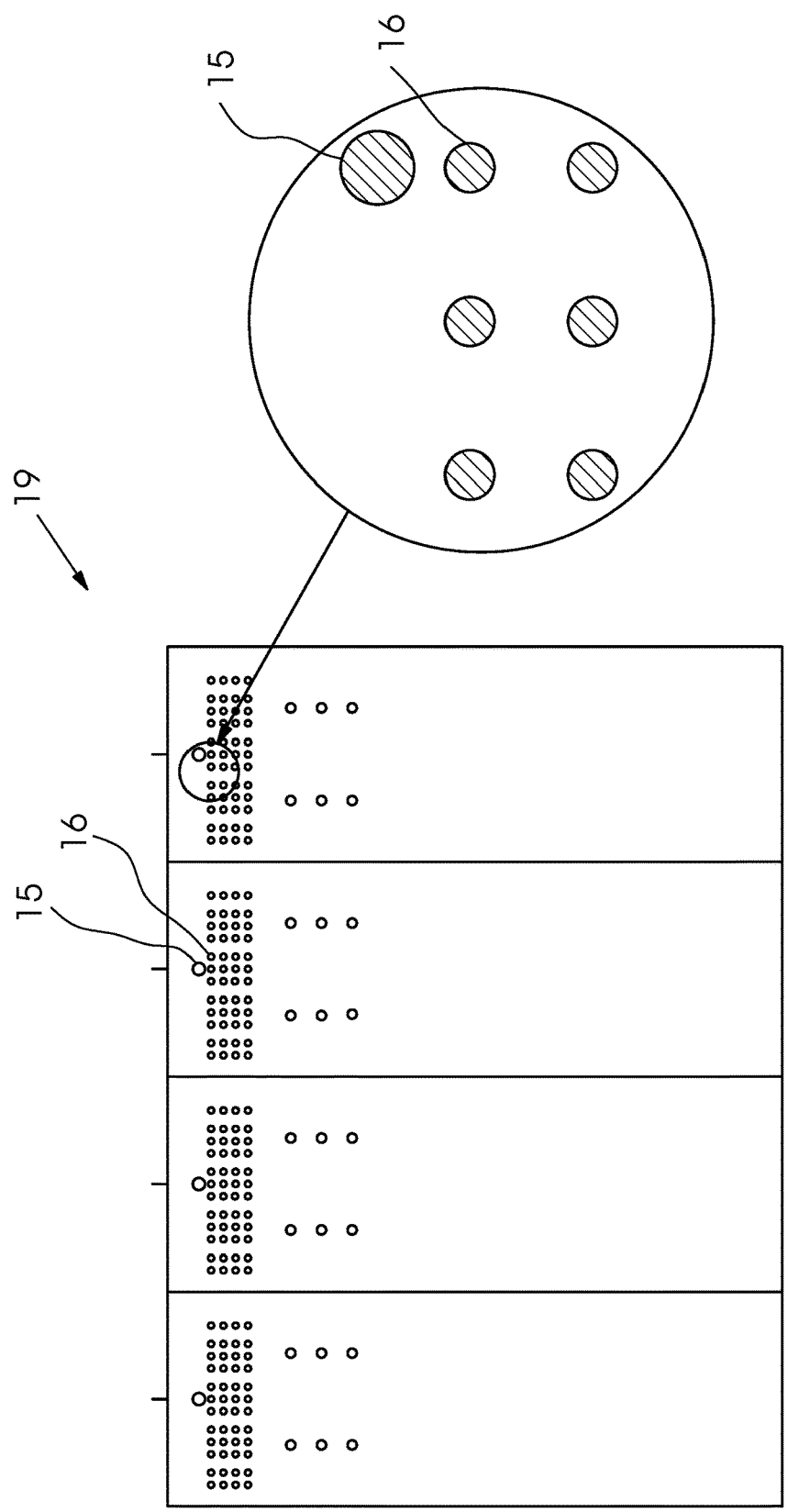
FIG. 4 is an illustration showing an example of a test chart sheet for a color separation.
Figure 5:
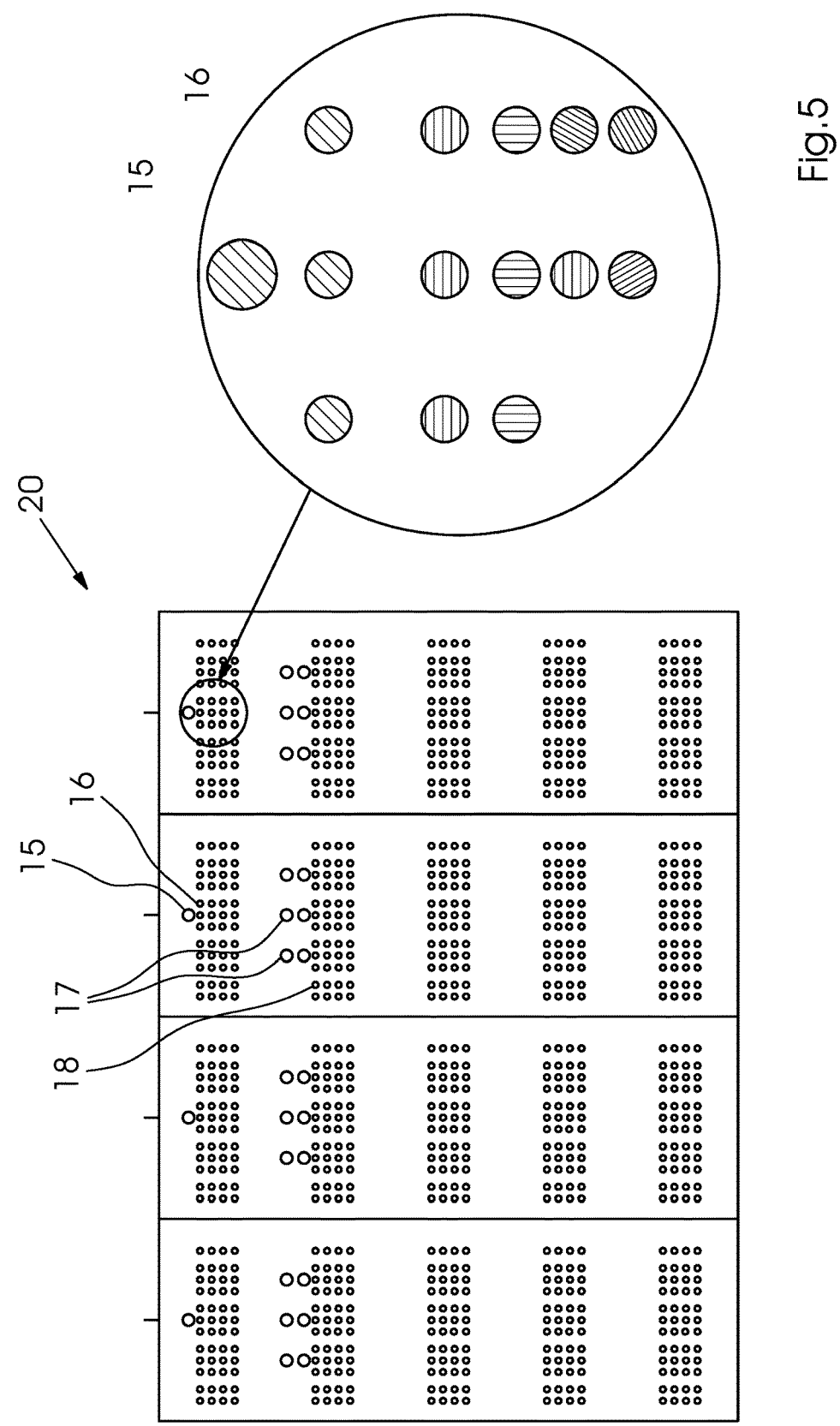
FIG. 5 is an illustration of a test chart sheet including all color separations.

The following paragraphs describe a test print chart 20 that the method of the invention requires. A particularly preferred embodiment of the test print chart 20 for multiple color separations is shown in FIG. 5. It creates data for all print heads that are used. In accordance with a further preferred embodiment, it is likewise possible to use a test print chart 19 with data for only one color separation. Such a test print chart 19 is shown in FIG. 4. In this case, however, the test print chart 19 needs to be printed and evaluated for every color separation.

Rows of filled circular discs 16, 18 are arranged on a print sheet in such a way that every print head generates discs. For every print head, at least three discs 16, 18 are arranged in such a way that they are not printed into the stitching region. Every print head should print at least two complete sets of neighboring circular discs 16, 18. The discs 16, 18 are to be distributed across the sheet in such a way that they span the largest possible region in the y-direction. This ensures a high resolution in both coordinate directions (x=direction of print bar, y=direction of paper transport). The discs 16, 18 need to be large enough for the method of the invention to provide good results even if there are white lines or nozzles that jet at an angle. The disc size may be determined experimentally with the aid of a simulation. For high-quality images obtained by the camera system described above, a target size of 60 camera pixels or >2.2 mm in diameter at a camera resolution of 670 dpi is sufficient. An additional, separate dot 15, 17 is provided for every camera 5 at a certain distance from the large rows and as close to the beginning of the print chart as possible to provide a reference dot for localizing dots. The requirements are the same as described above.

The following methods require a sub-process that determines the center of a circular disc at a sub-pixel level of accuracy. The method that is used for this purpose is now described in detail below.

Figure 2:
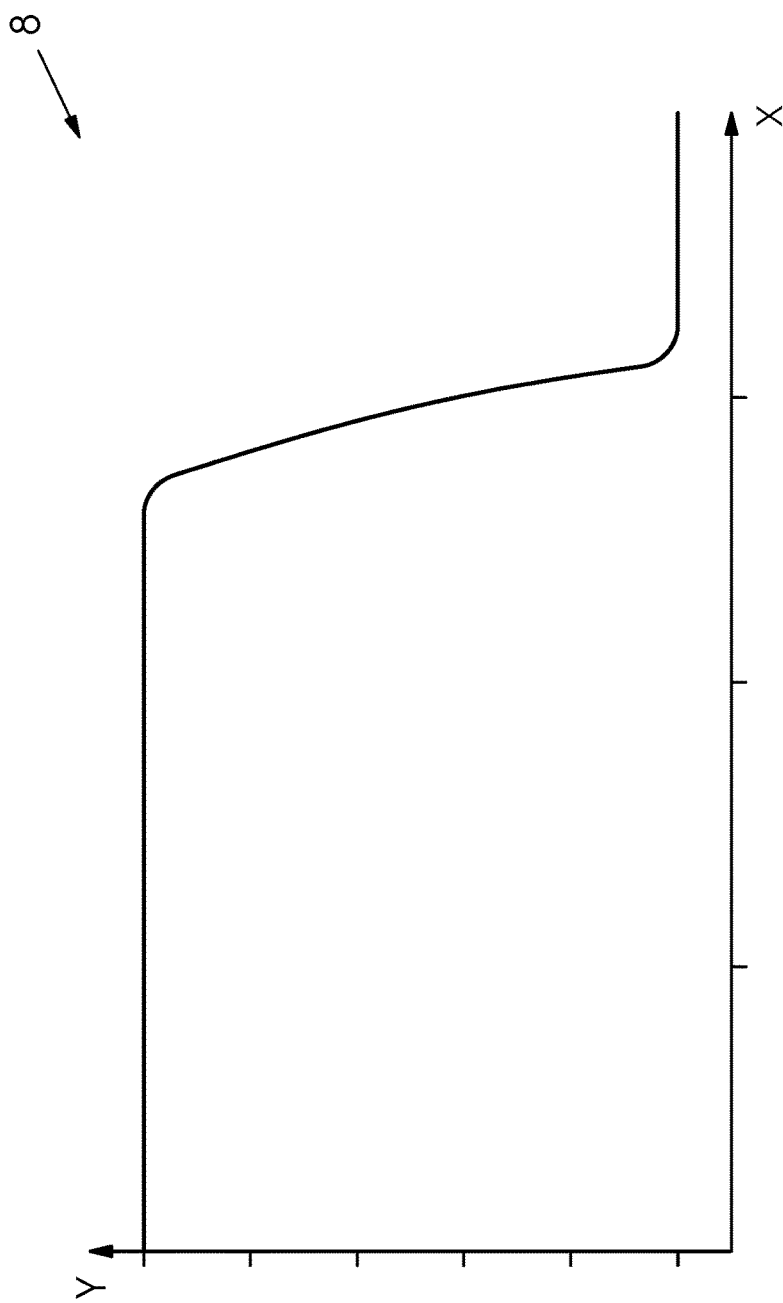
FIG. 2 is a graph showing a radial intensity gradient in a circular disc.
Figure 3:
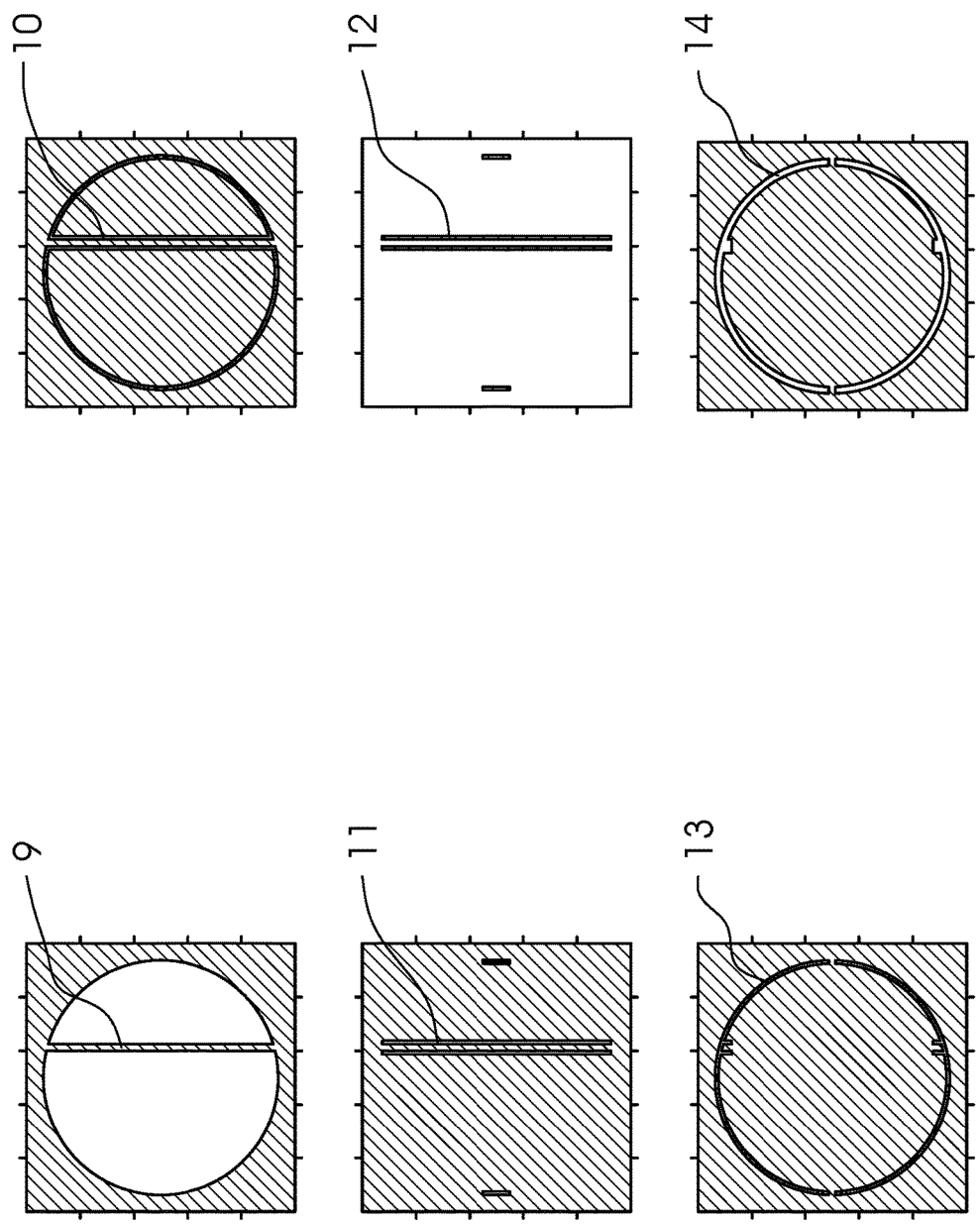
FIG. 3 are illustrations showing a filtering of stripe artifacts in the image masks.

Since the print color of the dot to be examined is known, with the aid of this information the image may be transformed into a high-contrast grayscale image in an ideal way for instance by selecting the channel R, G, or B that has the highest contrast relative to the printing material. A region (ROI) that is about 2× greater than the actual dot 16, 18 is cut out of the total image that has been transformed into a grayscale image. Edge detection is implemented in the ROI with the circular disc, which means that the edge of the dot remains in a binary image 10 as a line that is 1 pixel wide. To filter out line artifacts 9, 10 in the circular discs 16, 18, which now present themselves as double lines 11, 12, a further filter is applied to find vertical lines 11, 12 in the binary image that consist of one pixel and are at least 9 pixels high. These are then subtracted from the mask, resulting in an error-free circular disc 13 after the edge detection process. The threshold of at least 9 pixels may be configured to adapt the method to different camera resolutions. A cross through the center of the circular disc, which is approximately defined as the center of mass, is then added to the binary image. The result is referred to as a mask 13. The mask 13 is finally widened 14 to 3-5 pixels by dilatation. This is shown in a corresponding way in FIG. 3. The number of pixels by which it is widened is a function of the recording performance/step response of the camera system that is used. Now a non-linear least-squares fit is made with respect to the masked ROI data, wherein the parameters of a model of the print dot are determined. The model is defined by a radial intensity gradient f(r) 8 extending outwards from the center (x0, y0) of the circular discs. This is shown in FIG. 2. The radial intensity gradient f(r) is essentially defined as a jump from the central color value (A0+A1) to the background value A0 at a radius r0, which is widened to a width w to factor in the limited recording performance of the objective lens. Moreover, an asymmetry factor a may be factored in, for instance to factor in uneven resolutions in the x- and y-directions. This also relates to a reduction of the resolution in one direction, for example, to compensate for higher printing speeds.

Initially, expedient starting parameters are selected for all these parameters. Such parameters are, for instance, the center of mass of the image for $x_0$, $y_0$, the radius for $r_0$ expected from the printed image, empirical machine values for w, etc. Then the fitting process in accordance with a standard numerical process, for instance a Levenberg-Marquardt method, is carried out.

The results are then subjected to a plausibility check. For instance, the radius/center needs to be in the expected range. If this is not the case, if in doubt, the corresponding dot 16, 18 is dismissed and not used in the coordinate transformation process. This algorithm will work even if the circular disc 16, 18 is not completely located in the ROI and only a proportion of more than 50-60% is visible. However, in this case the degree of accuracy may be affected, which may, however, be factored in by a weighting or scoring of the results.

Figure 6:
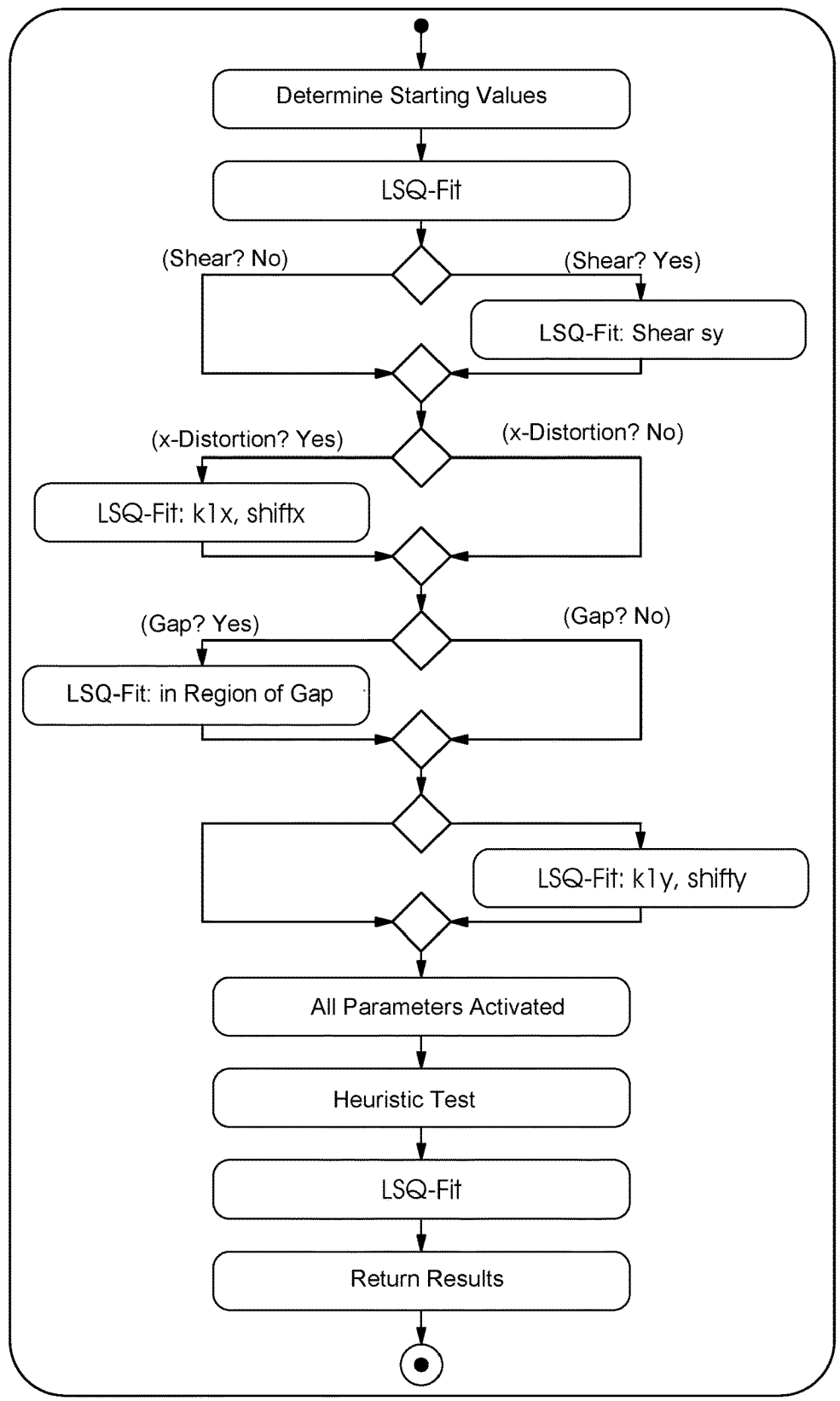
FIG. 6 is a flow chart of fundamental steps of a method according to the invention.

The actual method of the invention in particular in terms of the coordinate transformation between the print and the recorded camera images is schematically shown in FIG. 6. It has a number of now described steps.

Step 100—Beginning with a coarse—theoretically defined—initial coordinate transformation, the big "reference dot" 15, 17 is searched. Moreover, the print color of this dot is classified based on the RGB color values of the pixels in the dot. The dot is found by cutting out a large ROI about the expected dot position and then summing up in the x- and y-directions. In these two vectors that have been created in this way, beginning from both edges and moving inward, an intensity jump is searched that is the beginning of an area that is wider than three pixels. The color contrast for this region is determined. This step is repeated for all three color channels to select the channel that has the highest contrast. In the expected dot center, which is thus known with an accuracy of a few pixels, the print color may be classified against a saved table of print color characteristics. Based on this coarse positioning, the method described above is then applied to refine the results.

Step 110—The center coordinates of the large dot are used to refine/reference the initial coordinate transformation.

Step 120—Using the refined coordinate transformation, ROIs may then be cut out about the individual dots 16, 18 and the positions thereof may be determined by the method described above. The fitting results for every dot 16, 18, i.e.

the coordinates in camera pixels $x_m$, $y_m$ about its ideal position in print dots $x_d$, $y_d$ are known.

Step 130—Now outliers and errors are filtered out of the dot list. The following criteria are used for this purpose:
(1) There needs to be a minimum and a maximum contrast between the RGB values in the dot and in the background.
(2) The dot diameter needs to be in the expected range.
(3) The dot symmetry needs to be in a limited range about the expected value, which corresponds to the value 1 in an undistorted image.
(4) The edge steepness needs to be within an expected range.
(5) The center position must not be too far out, so that the entire dot preferably remains within in the range.
(6) A print-image-dependent minimum number of pixels must have been found in every row of the regular grid. Otherwise, the entire row is rejected.
(7) A print-image-dependent minimum number of pixels must have been found in every column of the regular grid. Otherwise, the entire row is rejected.

Step 140—The remaining dot value pairs ($x_m$, $y_m$, $x_d$, $y_d$) are then used to determine the parameters of a model of the coordinate transformation with a non-linear least squares algorithm such as the Levenberg-Marquardt algorithm. This model consists of a linear coordinate transformation with a shear term on the one hand and of a correction term for the distortion of the optics on the other, a 3rd degree polynomial, and further camera 5 artifacts such as split sensors (see, for instance, the "gap" in FIG. 6) and further parameters as shown in FIG. 6.

Step 150—Finally, for verification purposes, the model from the last step is used to convert the dots 16, 18 $x_m$, $y_m$ into print dots and their deviation from the expected ideal position is determined. The latter is considered as an error.

Step 160—Now the deviations that have been determined in this way may be checked print head by print head in order to detect significantly misaligned print heads. The dots 16, 18 of these heads are then eliminated from the list if they are not too many or they are assigned a lower weighting. A suitable statistic method for regression is iteratively reweighted least squares (IRLS), for instance. The method jumps back to step 140. This loop may potentially be repeated multiple times within a maximum repeat number to be defined by the user. The outlier print heads that have been detected in this way are indicated to the user for control steps/readjustment of the print heads. For readjustment purposes, the adjustment may be calculated by outputting the deviation of the actual print head positions from the expected position provided by the coordinate transformation.

Step 170—Up to this point, the calculation has been made per camera 5. Thus the individual results are now combined to a total result. Dots that are in the region of overlap of two adjacent cameras 5 by more than 50% are used for this purpose. The positions $x_m$, $y_m$ may previously be corrected in terms of the shear that was separately determined for every camera 5, s. the coordinate transformation parameters, for example. To make this step possible, it may be expedient to print more circular discs 16, 18 in the region of overlap of the camera 5 in which there must not be any region of overlap between print heads.

Step 180—Subsequently the calibration results for the individual print heads are combined and evaluated. Thus, for every print head, an average deviation of the position of its prints from the expected position in the x- and y-directions may be calculated from the coordinate transformation, or, for instance, the position of the dots in the next/previous print head. This corresponds to the register errors of the individual print heads, which may be used to control the setting and potentially to make readjustments within a color.

Step 190—Register error: In a further preferred embodiment, if there are coordinate transformations for multiple print colors, they may additionally be used to determine positional deviations of the individual print colors relative to one another. For this purpose, a fixed coordinate in camera pixels is successively transformed into the print pixel positions of the individual colors. For a machine with ideal settings, identical coordinates with an error of less than one pixel must be the result. If this is not the case, the register deviation from a reference color may be output as a register error. The determination is preferably carried out at different locations across the sheet and an error average is fed back.

The following is a summary list of reference numerals and the corresponding structure used in the above description of the invention:
1 image recording system
2 control unit of the inkjet printing machine
3 display
4 inkjet printing machine
5 image sensor/camera system
6 user
7 image processor
8 radial intensity gradient in a circular disc
9 circular disc with a strip-shaped artifact
10 circular disc with a strip-shaped artifact after edge detection
11 stripe-shaped artifact in the form of a double line after edge detection
12 stripe-shaped artifact in the form of a double line after edge detection inverted
13 contour of the circular disc after edge detection and artifact removal (mask)
14 mask created after widening of the contour of the circular disc
15 reference dot for referencing for a color separation
16 calibration dots/circular discs of a color separation
17 reference dot for referencing for further color separations
18 calibration dots/circular discs of further color separations
19 print test chart for a color separation
20 print test chart for multiple color separations

The invention claimed is:
1. A method for calibrating image sensors and adjusting print heads in an inkjet printing machine in an automated way via a computer, which comprises the steps of:
 printing a test print chart containing filled circular discs functioning as calibration dots, the filled circular discs having a minimum diameter that is selected in a way for them to function in an optimal way even if defective printing nozzles occur;
 recording the test print chart by means of at least one image sensor to create a digital image;
 determining a coordinate transformation between coordinates on the test print chart and coordinates of the at least one image sensor and the print heads via the computer;
 implementing a computer-assisted evaluation process of the digital image to determine the coordinates on the test print chart;
 deriving correction values for print head adjustment and camera at least one image sensor calibration from results of the coordinate transformation and/or a comparison thereof with determined measured values of the test print chart by means of the computer;

implementing the print head adjustment and the at least one image sensor calibration by means of the computer and using the correction values; and subdividing a printing substrate region to be printed and recorded by the at least one image sensor into image sensor regions corresponding to a number of the image sensors that are used, every one of the image sensor regions include a reference dot in a form of a filled circular disc printed centrally above the calibration dots, the reference dot being used for referencing within an individual image sensor region of the image sensor regions.

2. The method according to claim 1, wherein for all color separations that are used, the test print chart containing the filled circular discs is printed, every print head printing at least two complete rows of at least three said calibration dots in a form of the filled circular discs, the filled circular discs not in a stitching range of the print head and the at least two complete rows distributed over a printing substrate in such a way that they span a largest possible area in a direction of paper transport.

3. The method according to claim 1, wherein when the test print chart containing the filled circular discs is printed, every print head printing at least two complete blocks of rows of at least two said calibration dots in a form of the filled circular discs, the filled circular discs not located in a stitching region of the print head, and every block including at least one row of at least two said calibration dots for every color separation that is used and the rows of at least two said calibration dots distributed over a printing substrate in such a way that they span a largest possible area in a direction of paper transport.

4. The method according to claim 1, which further comprises providing a camera system to record the printed test print chart by means of the at least one image sensor, the camera system containing multiple line scan cameras disposed next to one another, the line scan cameras recording the test print chart at a resolution of at least 40-60% of a print resolution.

5. The method according to claim 1, wherein a computer-assisted evaluation process for determining the coordinates on the test print chart being done by detecting a center of the calibration dots and comprises the further following steps of:
converting a recorded test print chart into a high-contrast grayscale image;
cutting an image region including a circular disc out of an entire digital image;
performing at least one of:
implementing an edge detection process;
converting the image region into a binary image and filtering line artifacts out of the binary image;
adding a cross through a center of the circular disc to the binary image to create a binary mask;
widening the binary mask by dilatation;
determining parameters of a model of a print dot from the entire digital image, using the binary mask; and
checking results, namely whether the center and a radius of the circular disc are within an expected range.

6. The method according to claim 5, wherein the coordinate transformation implemented by the computer comprises the further following steps of:
searching the reference dot in a currently evaluated region of the test print chart by means of a theoretically calculated coordinate transformation that is already present;
selecting a color channel with a highest contrast if a camera has multiple color channels;
refining an initial coordinate transformation using center coordinates of the reference dot;
determining positions of available calibration dots by cutting out image regions about respective calibration dots and implementing the evaluation process;
filtering out deviating calibration dots and errors;
determining parameters of a model of the coordinate transformation using remaining calibration dots if sufficient calibration dots remain after filtering;
determining a deviation of the calibration dots from their expected ideal position; and
combining deviations as results for the print heads.

7. The method according to claim 5, wherein the coordinate transformations calculated for multiple color separations are used to determine register deviations in a form of positional deviations of individual print colors relative to one another and to correct them.

8. The method according to claim 7, wherein calculation of the register deviations is implemented at various locations distributed over the test print chart to determine a register deviation average.

* * * * *